United States Patent [19]
Gramer et al.

[11] Patent Number: 5,130,527
[45] Date of Patent: Jul. 14, 1992

[54] NIGHT VISION SCOPE WITH IMPROVED VOLTAGE SUPPLY

[75] Inventors: Mark E. Gramer, Albuquerque, N. Mex.; Terry D. Morris, Buckeye, Ariz.

[73] Assignee: Litton Systems, Inc., Beverly Hills, Calif.

[21] Appl. No.: 592,042

[22] Filed: Oct. 3, 1990

[51] Int. Cl.$^5$ ............................................. H01J 31/50
[52] U.S. Cl. ................................. 250/213 VT; 313/532
[58] Field of Search ............ 250/213 VT, 207, 214 R; 313/529, 532, 534, 537

[56] References Cited

U.S. PATENT DOCUMENTS

| | | | |
|---|---|---|---|
| 4,629,881 | 12/1986 | Fairbend et al. | 250/213 VT |
| 4,734,573 | 3/1988 | Dill | 250/213 VT |
| 4,755,725 | 7/1988 | Kastendieck et al. | 250/213 VT |

OTHER PUBLICATIONS

Walker, A., "Eyes In The Dark Night Vision In A New Light," *ICA*, Jul., 1989, pp. 54–61.
Brochure entitled "Low Voltage Step-Up DC-DC Converters," by Maxim Technologies, pp. 1–6, Mar. 1989.
Brochure entitled "Low Voltage Step-Up Converters," by Maxim Technologies, pp. 1–8, Mar. 1989.

*Primary Examiner*—David C. Nelms
*Assistant Examiner*—K. Shami
*Attorney, Agent, or Firm*—Poms, Smith, Lande & Rose

[57] ABSTRACT

A night vision scope which includes an improved voltage supply. A battery generates a voltage which is proportionally increased by a voltage step-up circuit to provide a voltage to an image intensifier and an infrared light source of the night vision scope. The voltage supply includes circuitry for limiting the voltage output of the voltage supply circuit if a battery is used which generates a voltage greater than that required by the elements of the night vision scope.

23 Claims, 3 Drawing Sheets

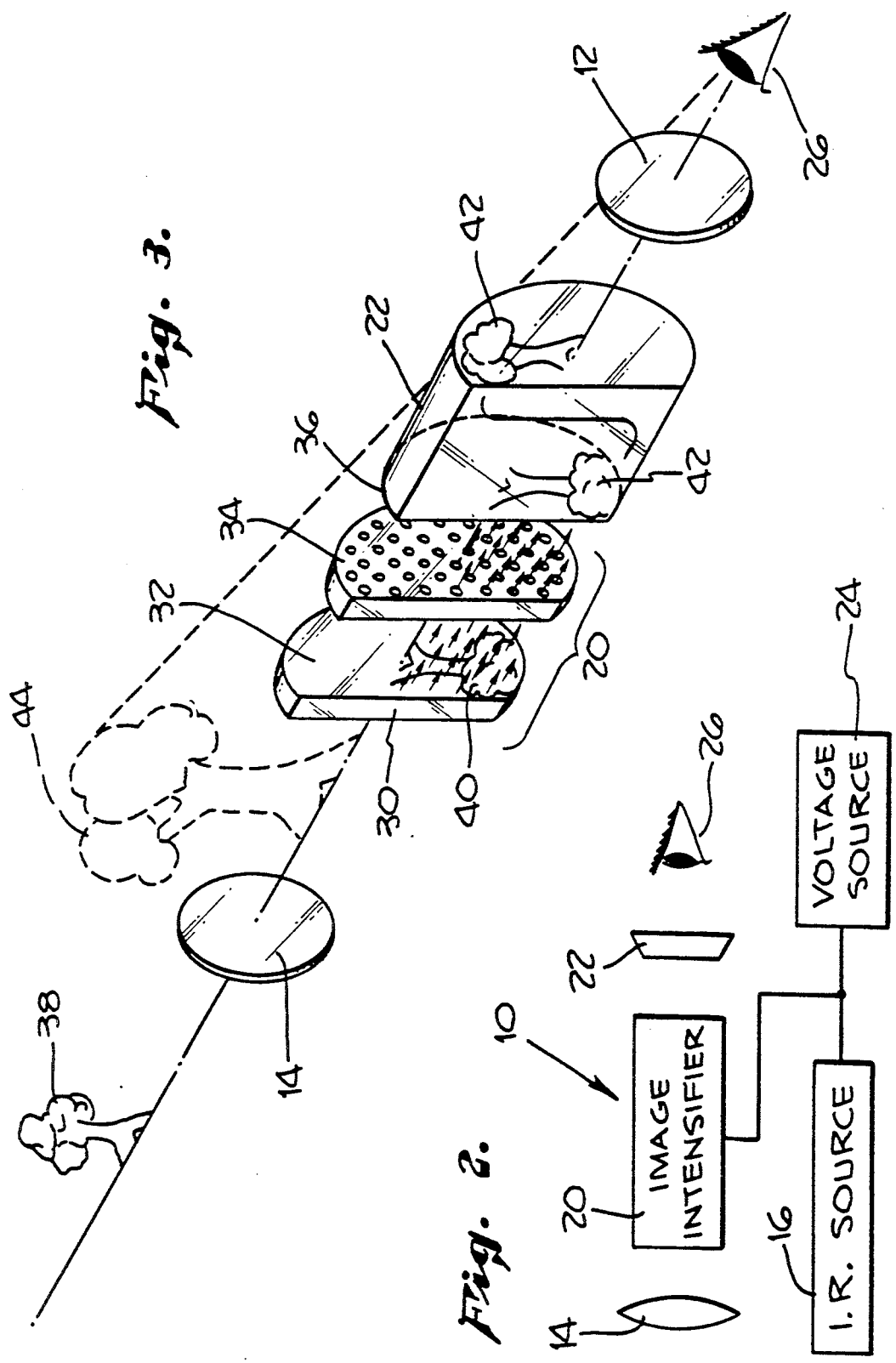

NIGHT VISION SCOPE WITH IMPROVED VOLTAGE SUPPLY

BACKGROUND OF THE INVENTION

The invention relates to night vision scopes, particularly, to a night vision scope with improved voltage supply.

Night vision scopes are used generally by military and law enforcement personnel for operations in low light conditions. This enables military and law enforcement personnel to use the night vision scopes to observe conditions at night and in dark buildings. A night vision scope allows the user to continue to make tactical advances and observe hostile tactical advances. New night vision scopes are also designed to assist pilots of helicopters and planes to more easily fly at night.

Early night vision scopes allowed the user to observe light in the infrared spectrum. To do so, sufficient infrared light, invisible to the human eye, had to be supplied by beacons to illuminate an area. These scopes were used for only a limited period of time because of the concern that hostile forces could use similar night vision scopes to locate the infrared beacon and its user.

Currently, night vision scopes utilize image intensification technologies. That is, the night vision scope receives ambient light from the environment and intensifies the image to produce an output image which is visible to the human eye. The present generation of night vision scopes operate to intensify low levels of visible light and make visible the light from the infrared spectrum.

The image intensification process involves conversion of the received ambient light into electron patterns, intensification and energization of the electron patterns, and conversion of the electron patterns into light visible to the observer.

Use by law enforcement officials and army personnel during active engagement with hostile forces requires that the night vision scopes be rugged and light weight. Further, it is important that the voltage supply for the night vision scope be dependable, light weight, and easily renewed. In constructing a rugged night vision scope it is important for the scope to be impervious to shocks and environmental conditions, such as moisture. Accordingly, the voltage supply must also be impervious to environmental conditions.

Night vision scopes require batteries to supply the power. Either a single specialized battery or two conventional batteries can be used. Typical night vision scopes use two batteries. Use of two batteries instead of one increases the weight of the night vision scope which is a significant disadvantage.

Since night vision scopes are designed to be light weight, using one battery is preferable to using two batteries. However, due to battery design constraints single batteries of suitable size which provide the correct voltage for night vision scopes are not generally manufactured. Thus, specialized batteries must be custom designed and manufactured at great expense.

Any battery used in a night vision scope must be easily replaceable but sealed against water leakage into the battery area. When using two batteries, such as 1.5 volt DC batteries, the container for these batteries must be oval shaped to accept both batteries. The oval shape of the battery container makes it difficult to seal the container to make it water tight because specialized seals are required.

If only one battery is used, a single cylindrical battery container can be used in combination with an O-ring of conventional construction to accomplish the seal desired. However, as discussed above, single batteries must be custom made to provide the correct voltage for a night vision scope.

A voltage step-up circuit could be used as part of the voltage supply in conjunction with a voltage source, such as a battery, to increase the voltage supplied to a value above the voltage of the battery alone. However, voltage step-up circuits often require complex active elements which increase the chance of a malfunction of the circuit. Further, additional components for a voltage step-up circuit can increase the weight of the night vision scope.

Voltage step-up circuits are known. For example, a voltage step-up circuit may be constructed utilizing a Maxim Low Voltage Step-Up DC-DC convertor manufactured by Maxim Integrated Products. This circuit utilizes the charging and discharging of an inductor to step-up a battery voltage.

In addition to stepping up the voltage from a battery, it is sometimes desirable to provide for a battery having a voltage greater than the necessary output voltage from the voltage supply circuit. For instance, in very cold weather an alkaline battery does not function properly. If a lithium battery is used which has a voltage output greater than the desired voltage, the voltage supply circuit must also limit the voltage output to protect the night vision scope elements.

However, such a step-up circuit has not been used in the field of night vision scopes. There are numerous reasons for this nonuse, such as the desire for compact size, for ruggedness, and for light weight.

SUMMARY OF THE INVENTION

Accordingly, a principle object of the present invention is to provide a night vision scope having an improved voltage source.

Another object of the invention is to provide a night vision scope which minimizes the weight required for batteries in the voltage source.

Still another object of the present invention is to provide a voltage source for a night vision scope which uses a minimal amount of circuitry in order to minimize weight and complexity while maximizing the reliability of that circuitry.

Additional objects and advantages of the invention will be set forth in part in the description which follows, and in part will be obvious from the description, or maybe learned by practice of the invention. The objects and advantages of the invention may be realized and attained by means of the instrumentalities and combinations particularly pointed out in the appended claims.

To achieve the foregoing objects and in accordance with the purpose of the invention, the night vision scope for intensifying a received image of this invention comprises light receiving means for receiving an image; image intensification means including light converting means for converting the light in the image into electrons in proportion to the intensity of the received light to form a pattern of electrons corresponding to the received image energization means for increasing the energy of the electrons in the electron pattern and electron converting means for converting the electron pattern into a visible light image of the received image;

battery means for supplying a first voltage; and voltage supply means including voltage step-up means for supplying a second voltage coupled to the light converting means, the energization means, and the electron converting means, the second voltage being proportionately greater than the first voltage.

The accompanying drawings which are incorporated in and constitute a part of the specification, illustrate one embodiment of the invention and, together with the description, serve to explain the principles of the invention.

BRIEF DESCRIPTION OF THE DRAWINGS

FIG. 2 is a block diagram illustrating elements of a night vision scope according to the present invention;

FIG. 3 is an illustration of the elements of the image intensifier of FIG. 2;

DESCRIPTION OF A PREFERRED EMBODIMENT

Reference will now be made in detail to a present preferred embodiment of the invention, an example of which is illustrated in the accompanying drawings.

Figure 1A:
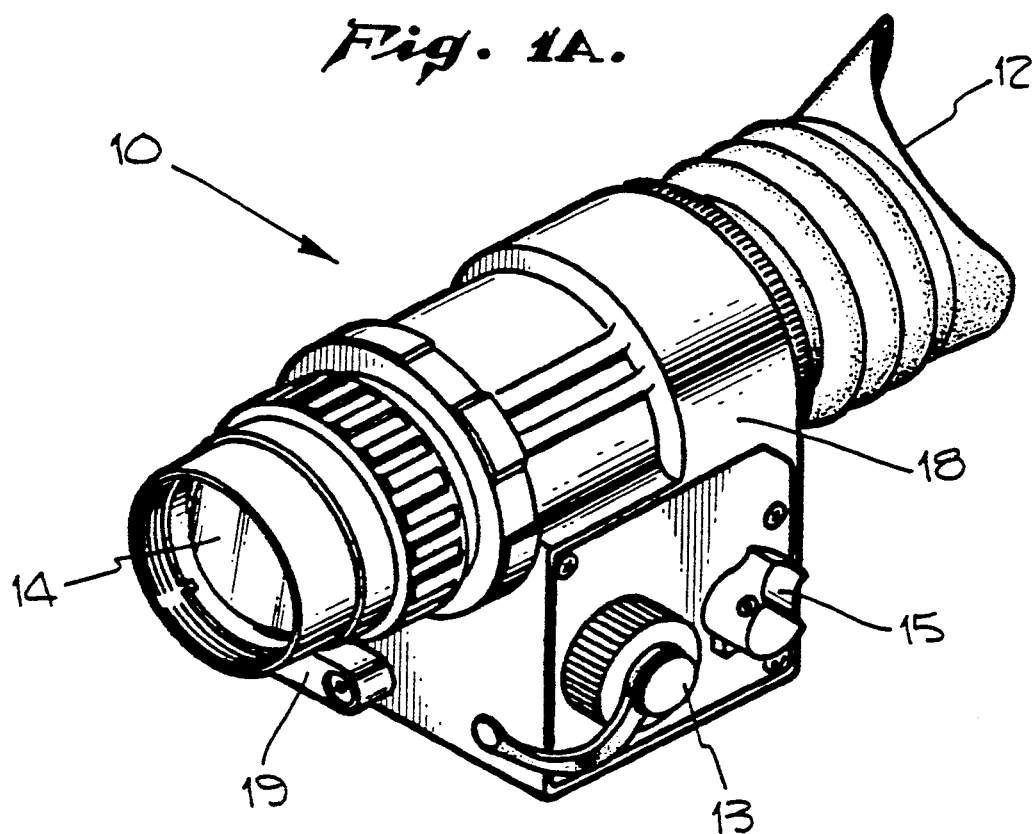
FIGS. 1A and 1B are illustrations of a night vision scope according to the present invention.
Figure 1B:
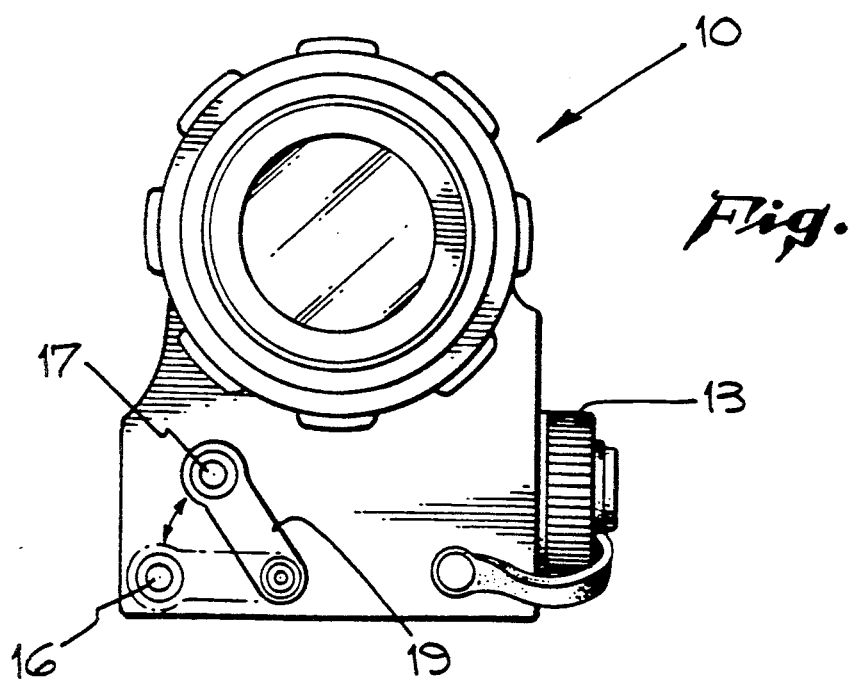

A night vision scope utilizing the teachings of the presently preferred embodiment is illustrated in FIG. 1. Night vision scope 10 intensifies a received image. Night vision scope 10 includes an eye piece 12, a lens 14, an infrared light source 16, and an infrared light source lens 17. A housing 18 contains the electronics and optics required for operation of the invention. Mounted face of housing 18 is an operating switch 15 and cap 13 for the single battery which generates a voltage for night vision scope 10.

The single battery is housed in a battery chamber which includes cap 13. The chamber cap 13 is sealed with a standard O-ring. Utilization of an O-ring reduces the complexity and construction costs of night scope 10 since an off the shelf element may be used.

According to the present invention, night vision scope 10 includes a light receiving means for receiving an image. In the present preferred embodiment, lens 14 receives the light image and magnifies it.

The user of night vision scope 10 places his eye adjacent to eye piece 12 to observe the resultant intensified received image. Infrared light source 16 may be activated to emit infrared light in the direction which lens 14 is directed. Preferably, infrared light source 16 is an infrared light emitting diode. A focus lens 17 is mounted on swing arm 19 to be optionally positioned over infrared light source 16. Lens 17 may be positioned over infrared light source 16 to focus the infrared light, such as for using light source 16 for a spot light.

FIG. 2 illustrates a block diagram of the functional elements of night vision scope 10. Like reference numerals indicate like structures. Accordingly, FIG. 2 illustrates objective lens 14 and infrared light source 16. Night vision scope 10 further includes an image intensifier 20, an output window 22 and voltage source 24. Voltage source 24 supplies the voltage to both infrared light source 16 and image intensifier 20.

An image is received through lens 14 and transmitted to image intensifier 20. After image intensification a visible image is output from image intensifier 20 to output window 22. Observer 26 views the intensified image in output window 22.

FIG. 3 illustrates the image intensification process in conjunction with the structural elements of image intensifier 20. Image intensifier 20 includes an input window 30, a photo cathode 32, a micro channel plate 34, and a phosphor screen 36. In a preferred embodiment of the present invention the elements of image intensifier 20 are constructed in a wafer tube configuration with the elements being configured as wafers.

Photo cathode 32 is located between input window 30 and micro channel plate 34. On the opposite face of micro channel plate 34 is located phosphor screen 36 at the input to output window 22. The eye piece receives the output from output window 22. An observer 26 observes an intensified output image through eye piece 12.

During operation of night vision scope 10 the light from object 38 is received through objective lens 14. In the presently preferred embodiment, objective lens 14 is a convex lens which gathers light and magnifies the image. Light passes through input window 30 onto photocathode 32. Photocathode 32 responds to the received light by generating a number of electrons in proportion to the intensity of received light. The number of electrons are proportional to the intensity of the received light to form a pattern of electrons corresponding to the received image. Photocathode 32 is sensitive to infrared light as well as light in the visible spectrum so that electrons are produced in response to infrared light passing through the objective lens and input window onto photocathode 32.

Electrons from photocathode 32 are emitted into micro channel plate 34. The energy of the electrons from photocathode 32 is increased because of a voltage applied across the two faces of micro channel plate 34. Micro channel plate 34 consists of a disk of optical fibers each of whose primary cylindrical axis is oriented parallel to the direction of received electrons from photocathode 32.

The optical fibers in micro channel plate 34 are held together with reflective cladding between the fibers. Further, each face of micro channel plate 34 has an electrode deposited thereon so that a potential may be generated between the two faces to accelerate and energize the electrons entering the optic fibers. Micro channel plate 34 also multiplies the number of electrons by adding additional electrons.

The energized and multiplied electron pattern from micro channel plate 34 exits the micro channel plate and strikes phosphor screen 36. Phosphor screen 36 generates a visible light image corresponding to the image received through objective lens 14. Phosphor screen 36 in the preferred embodiment acts as means for converting the electron pattern generated by photocathode 32 into a visible light image of the received image.

Since the objective lens 14 inverts the image of the observed object 38, input image 40 is upside down during the image intensification process and results in an upside down image on the output of phosphor screen 36. Accordingly, output image 42 must be inverted for observer 26.

Output window 22 transmits output image 42 to eye piece 12 and observer 26. Output window 22 is made of optical fiber. In order to invert output image 42, the optical fiber output window 22 is softened and rotated 180° from its origin to the output during manufacture.

Observer 26 will observe a correctly oriented output image 42 through eye piece 12 as a virtual image 44. In this case virtual image 44 is magnified in size due to objective lens 14 as well as its light being intensified.

Figure 4:
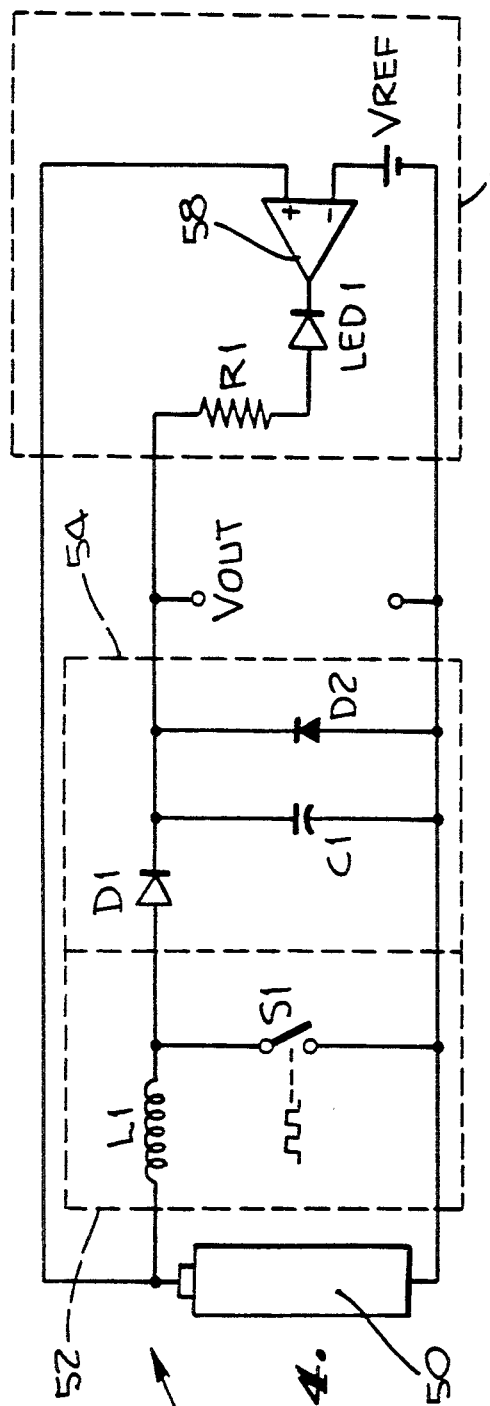
FIG. 4 is a circuit diagram of the voltage source of FIG. 2.

FIG. 4 is a simplified circuit diagram of the voltage supply 24. Voltage supply 24 includes battery 50, a step-up circuit 52, a rectifying circuit 54, and a low battery indicator circuit 56. In accordance with the present invention, a battery means supplies a first voltage. Preferably, battery 50 supplies a voltage and is a commercially available 1.5 volt battery.

In accordance with the present invention, the night vision scope includes a means for supplying a second voltage to the light converting means, the means for increasing the energy of the electrons, and the electron converting means. The second voltage is proportionately greater than the first voltage. In the preferred embodiment of the present invention, voltage supply circuit 24 produces an output voltage $V_{out}$ which is greater than the voltage supplied by battery 50. In the preferred embodiment, voltage $V_{out}$ is two times the voltage supplied by battery 50, i.e., 3 volts. Other voltage values and proportions may be used.

The voltage of battery 50 is input to step-up circuit 52. Step-up circuit 52 includes an inductor L1 and a switching circuit S1. The output of step-up circuit 52 is fed to rectifying circuit 54.

Step-up circuit 52 operates by oscillating switch S1 open and closed. When the switch is closed, current builds up in the coil, creating a magnetic field. Next, switch S1 is opened and the magnetic field collapses in inductor L1. Accordingly, the voltage across the inductor reverses polarity. This voltage across the inductor L1 adds to the voltage of battery 50 to produce a total voltage which is greater than the voltage produced by battery 50 alone.

In order to supply a constant voltage at $V_{out}$, rectifier circuit 54 is utilized to smooth out the variations in voltage due to the cycling of switch S1. Rectifier circuit 54 includes diode D1 and capacitor C1. Rectifier circuit 54 works in a conventional manner to smooth out voltage variations at $V_{out}$.

A zener diode D2 is included in rectifying circuit 54 to facilitate utilization of a battery 50 which supplies a voltage greater than the voltage required by night vision scope 10. Zener diode D2 has an operational value slightly greater than the required voltage. Accordingly, voltage $V_{out}$ does not exceed a maximum value determined by zener diode D2. Preferably, zener diode is rated as a 3.3 volt zener diode so that the output voltage has a maximum output of 3.3 volts.

For operation of the present preferred embodiment in extremely cold temperatures, the 1.5 volt alkaline battery does not function properly. Therefore, a 3.9 volt lithium battery is used in voltage supply circuit 24. Output voltage $V_{out}$ is then limited to a maximum value of 3.3. volts. As the lithium battery wears down below the required output voltage of 3.0 volts, voltage step-up 52 will function to increase the battery voltage as described above.

In order to detect a low voltage condition of battery 50 a low voltage detecting circuit 56 is provided. This low voltage circuit produces a reference voltage $V_{ref}$ which is compared to the voltage of battery 50 by comparator 58. If the battery voltage is lower than the reference voltage $V_{ref}$, current flows through resistor R1 and through light emitting diode LED1. Accordingly, light emitting diode LED1 will light when the voltage of battery 50 goes below $V_{ref}$. In a preferred embodiment of the invention battery 50 produces a 1.5 volt output, and $V_{ref}$ is selected to be 1.17 volts.

In the preferred embodiment of the invention a switching circuit which is used to implement switch S1 is an off the shelf component. In the presently preferred embodiment a Maxim Low Voltage Step-Up DC-DC Convertor, catalog number MAX657 manufactured by Maxim is utilized.

Figure 5:
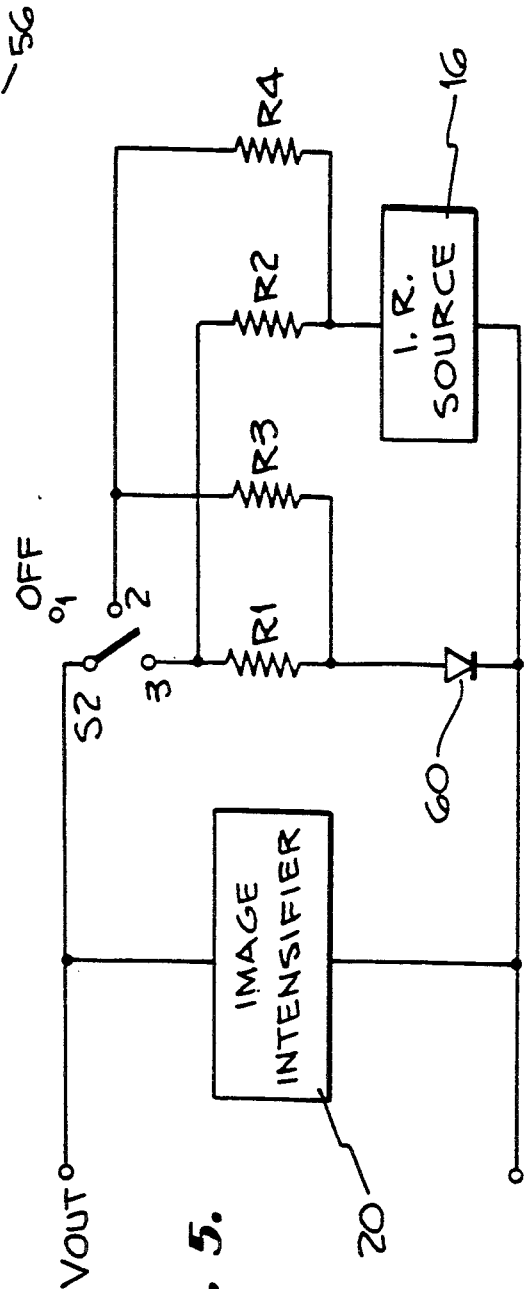
FIG. 5 is a circuit diagram showing how components of a night vision scope are supplied power by the voltage source of FIG. 4.

FIG. 5 illustrates the application of output voltage $V_{out}$ to the elements of night vision scope 10 of the presently preferred embodiment. That is, as discussed above, output $V_{out}$ is applied to image intensifier 20 and its associated components. The voltage $V_{out}$ is also applied to provide voltage to an infrared light source 16 and the light emitting diode (LED) infrared indicator 60. LED infrared indicator 60 indicates the status of infrared light source 16. That is, infrared light source 16 can be selected to be either off or on at two different power settings.

Infrared light source 16 may be selectively activated with switch S2. If position 1 of switch S2 is selected, the infrared light source remains inactive and no infrared light is emitted. If position 2 of switch S2 is chosen, a low power condition of infrared light source is activated and LED infrared indicator 60 indicates this low power status. That is, a low level of infrared light is emitted from infrared light source 16. This low level of light is generated because of the low level of power supplied through resistor R4 to infrared light source 16. Further, LED infrared indicator 60 is activated but at a low level due to the amount of power supplied through resistor R3. The LED infrared indicator 60 is located so that it may be viewed through eye piece 12 of night vision scope 10.

A high level or high intensity of infrared light will be emitted from infrared light source 16 if position 3 of switch S2 is selected. The LED infrared indicator 60 will indicate this higher intensity output of infrared light source 16. The higher intensity of infrared light emitted from infrared light source 16 will be due to the increased power supplied to infrared light source 16 through resistor R2. Resistor R2 will be selected to have a lower resistance value than resistor R4 since greater power must flow through resistor R2 for a fixed voltage. Likewise, the resistance of resistor R1 will be chosen to be less than the resistance of resistor R3.

The two different levels of infrared light emitted from infrared light source 16 allows the user of night vision night scope 10 to select two different modes of infrared light emission. In the low level mode the user of the night vision scope 10 can inspect maps with the aid of image intensifier 20 at night or do other tasks at close range requiring a low level of illumination. If a higher level of infrared light is required for viewing objects in, for example a room in a house which is dark, the high level of infrared light emitted from infrared light source 16 may be selected.

It will be apparent to those skilled in the art that various modifications and variations could be made in the night vision scope of the present invention without departing from the scope or spirit of the invention. As an example, night vision scope 10 may be altered to eliminate the infrared light source 16 to reduce its cost. Further, the invention may be used in a device that takes the form of a single viewing device with optics for two eyes, or two viewing devices for both eyes. Thus, it is intended that the present invention cover the modifications and variations of this invention provided they come within the scope of the appended claims and their legally permissible equivalents.

What is claimed is:

1. A night vision scope for intensifying a received image, comprising:
   light receiving means for receiving an image;
   image intensifier means including:
      light converting means for converting the light in said image into electrons in proportion to the intensity of the received light to form a pattern of electrons corresponding to said received image,
      energization means for increasing the energy of the electrons in the electron pattern, and
      electron converting means for converting the electron pattern into a visible light image of the received image;
   battery means for supplying a first voltage, said battery means comprising a single battery; and
   voltage supply means including voltage step-up means for supplying a second voltage to said image intensifier means, said second voltage being proportionately greater than said first voltage.

2. A night vision scope according to claim 1, wherein said voltage supply means further includes a voltage rectifier circuit for minimizing variations in the voltage output from said voltage step-up means.

3. A night vision scope according to claim 1 further comprising a substantially cylindrical battery chamber for housing said battery means, said battery chamber including a cap and an O-ring for sealing said cap.

4. A night vision scope according to claim 1, further including an infrared light source.

5. A night vision scope according to claim 4 wherein said voltage supply means supplies said second voltage to said infrared light source.

6. A night vision scope according to claim 5 wherein said voltage supply means includes means for supplying two different power levels to said infrared light source from said second voltage.

7. A night vision scope according to claim 1 wherein said voltage supply means includes limiting circuit means for limiting the second voltage to a predetermined value and inhibiting said voltage step-up means.

8. A night vision scope according to claim 7, wherein said limiting circuit means includes a zener diode.

9. A night vision scope according to claim 1, wherein said voltage step-up means includes an inductor and a switch circuit.

10. A night vision scope according to claim 9, wherein said switch circuit oscillates open and closed.

11. A voltage supply circuit for a night vision scope, comprising:
    a battery means for generating a first voltage, said battery means comprising a single battery;
    voltage step-up circuit means, coupled to said battery means, for generating a second voltage proportional to said first voltage; and
    infrared light source control means for supplying first and second power levels to activate an infrared light source to generate corresponding, respective first and second light levels.

12. A voltage supply circuit according to claim 11 further including a voltage rectifier circuit for minimizing variations in the voltage output from said voltage step-up circuit.

13. A voltage supply circuit according to claim 11, further including limiting circuit means for limiting the second voltage to a predetermined value and inhibiting the function of said voltage step-up circuit.

14. A voltage supply circuit according to claim 13, wherein said limiting circuit means includes a zener diode.

15. A voltage supply circuit according to claim 11, wherein said voltage step-up circuit means includes an inductor and a switch circuit.

16. A voltage supply circuit according to claim 15, wherein said switch circuit oscillates open and closed.

17. A night vision scope for intensifying a received image, comprising:
    light receiving means for receiving an image;
    image intensifier means including:
       light converting means for converting the light in said image into electrons in proportion to the intensity of the received light to form a pattern of electrons corresponding to said received image,
       energization means for increasing the energy of the electrons in the electron pattern, and
       electron converting means for converting the electron pattern into a visible light image of the received image; and
       a single 1.5 volt battery for supplying the total voltage required by said image intensifier means.

18. A night vision scope according to claim 17, further including a substantially cylindrical battery chamber for housing said single battery.

19. A night vision scope according to claim 18, wherein said batter chamber includes a cap and an O-ring for sealing said cap.

20. A night vision scope for intensifying a received image, comprising:
    light receiving means for receiving an image;
    image intensifier means including:
       light converting means for converting the light in said image into electrons in proportion to the intensity of the received light to form a pattern of electrons corresponding to said received image,
       energization means for increasing the energy of the electrons in the electron pattern, and
       electron converting means for converting the electron pattern into a visible light image of the received image;
    battery means for supplying a first voltage; and
    voltage supply means including:
       voltage step-up means for supplying a second voltage, coupled to said image intensifier means, said second voltage being proportionately greater than said first voltage, and
       limiting circuit means for limiting the second voltage to a predetermined value and inhibiting said voltage step-up means, said limiting circuit means including a zener diode;
    wherein, said first voltage is 1.5 volts and said predetermined voltage is 3.3 volts.

21. A night vision scope for intensifying a received image, comprising:
    light receiving means for receiving an image;
    image intensifier means including:
       light converting means for converting the light in said image into electrons in proportion to the intensity of the received light to form a pattern of electrons corresponding to said received image, energization means for increasing the energy of the electrons in the electron pattern, and electron converting means for converting the electron pattern into a visible light image of the received image;

battery means for supplying a first voltage, said battery means consisting of a single 1.5 volt battery; and voltage supply means including voltage step-up means for supplying a second voltage, coupled to said image intensifier means, said second voltage being proportionately greater than said first voltage.

22. A night vision scope according to claim 21, further comprising a substantially cylindrical battery chamber for housing said 1.5 volt battery, said battery chamber including a cap and an O-ring for sealing said cap.

23. A voltage supply circuit for a night vision scope, comprising:

a battery means for generating a first voltage;

voltage step-up circuit means, coupled to said battery means, for generating a second voltage proportional to said first voltage;

infrared light source control means for supplying first and second power levels to activate the infrared light source to generate corresponding, respective first and second light levels; and limiting circuit means for limiting the second voltage to a predetermined value and inhibiting the function of said voltage step-up circuit means, said limiting circuit means including a zener diode;

wherein said first voltage is 1.5 volts and said predetermined voltage is 3.3 volts.

* * * * *